K. LÜFT.
SILO OR FILLING TRUNK FOR POWDERED OR GRANULAR MATTER.
APPLICATION FILED NOV. 11, 1920.

1,385,254.

Patented July 19, 1921.

INVENTOR
KARL LÜFT
BY Munn & Co
ATTORNEYS

K. LÜFT.
SILO OR FILLING TRUNK FOR POWDERED OR GRANULAR MATTER.
APPLICATION FILED NOV. 11, 1920.

1,385,254.

Patented July 19, 1921.
2 SHEETS—SHEET 2.

INVENTOR
KARL LÜFT
BY
ATTORNEYS

UNITED STATES PATENT OFFICE.

KARL LÜFT, OF DARMSTADT, GERMANY, ASSIGNOR TO THE FIRM RÖHM & HAAS, OF DARMSTADT, HESSIA, GERMANY.

SILO OR FILLING-TRUNK FOR POWDERED OR GRANULAR MATTER.

1,385,254.     Specification of Letters Patent.     Patented July 19, 1921.

Application filed November 11, 1920. Serial No. 423,458.

*To all whom it may concern:*

Be it known that I, KARL LÜFT, a citizen of the Free State of Bavaria, in the German Republic, residing at Darmstadt, in the State of Hesse, Germany, have invented Improvements in Silos or Filling-Trunks for Powdered or Granular Matter, for which I have filed an application in Germany, Sept. 18, 1918; in Norway, Aug. 25, 1920; and in France, Sept. 3, 1920; and I do hereby declare the following to be a full, clear, and exact description of the same.

The object of the improvements is to provide an apparatus of this class from which the matter such as flour, powdered chemicals, salts, dye-stuffs, and the like, can be discharged in a uniform flow. With this object in view my invention consists in providing superposed sets of transverse bars within the apparatus the bars of each set being disposed large distances apart, and the bars of the successive sets being offset with relation to one another, so as to provide irregularly disposed members for breaking up or cutting through the mass of the loose material. By thus disposing the bars the material is not supported thereon but it is made to move downward in a uniform flow and without being formed into a funnel, after leaving the opening of the outlet.

In order that my invention be more clearly understood several examples embodying the same have been shown in the accompanying drawings, in which the same reference characters have been used in all the views to indicate corresponding parts. In said drawings—

Figure 1:
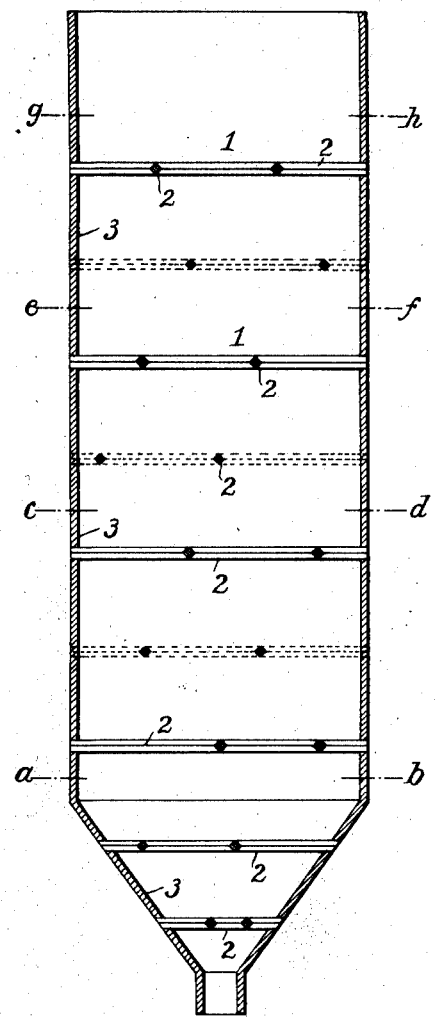
Figure 1, is a vertical longitudinal section of the apparatus.
Figure 5:
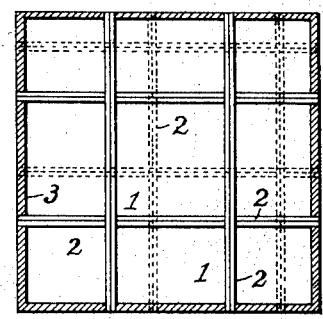
Figs. 2–5, are horizontal cross-sections taken respectively on the lines *a—b, c—d, e—f*, and *g—h* of Fig. 1, Fig. 6, is a vertical longitudinal section of a modified construction.
Figure 4:
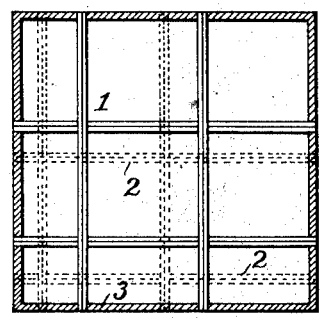
Figure 3:
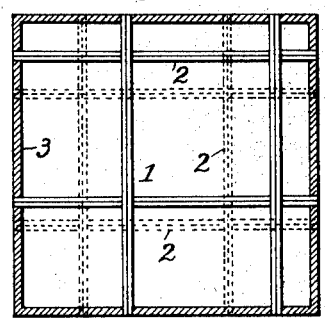
Figure 2:
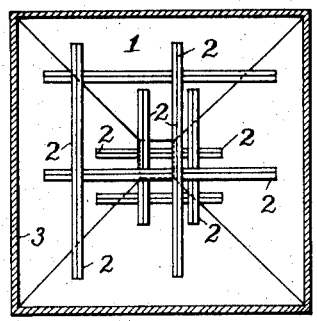

In Figs. 1–5 I have shown a silo which is provided with a plurality of superposed horizontal frames 1 each consisting of bars 2 constructed so as to permit the material to readily slide therefrom downward. As shown the bars are narrow horizontally and they are formed with sloping or wedge shaped upper and lower surfaces $2^a$ and their relative distances are such that large bulks of the material can not be held between the same. The bars of the superposed frames are displaced with relation to one another, as is best shown in the cross-sectional views of Figs. 2–5. The frames are secured to the walls 3 of the silo in any preferred way, and in some cases the superposed frames are supported upon one another by upright rods constructed in such a way that the material does not adhere thereto. The bars serve to break up or cut through the mass of loose material and thereby prevent it from clogging in the silo. It is to be understood that the material receives sufficient momentum to cause the bars to break up the material.

Figure 6:
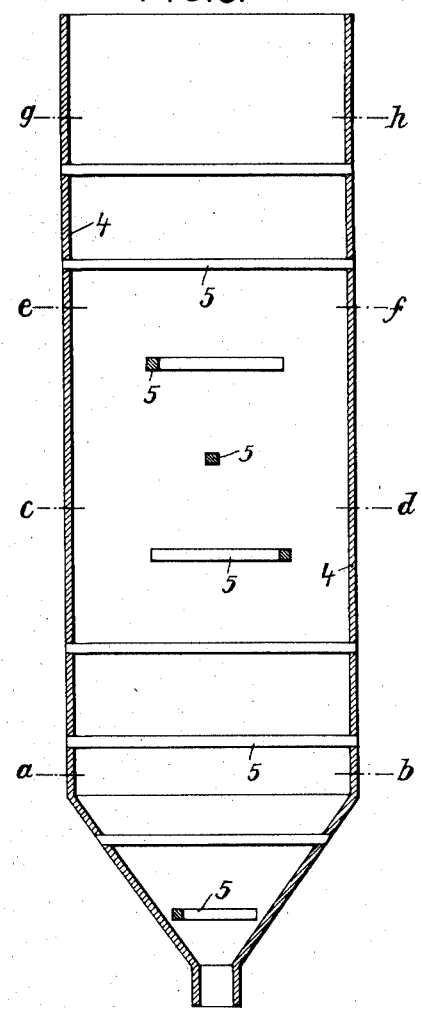
Figure 7:
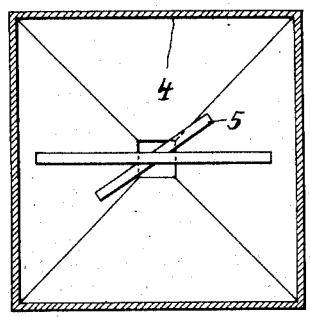
Figs. 7–10, are horizontal cross-sections taken respectively on the lines *i—j, k—l, m—n,* and *o—p* of Fig. 6.
Figure 10:
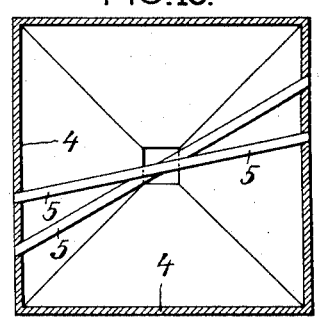
Figure 9:
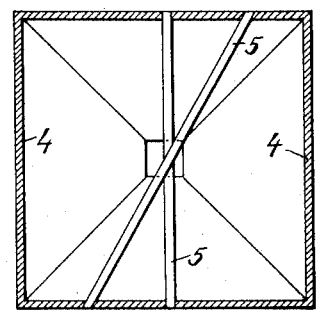
Figure 8:
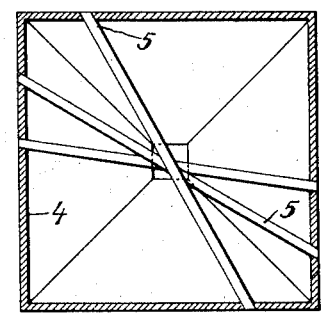

In the modification shown in Figs. 6–10 transverse horizontal bars 5 are secured to the walls 4 of the silo, and the said bars are disposed angularly to one another, so as to be displaced relatively to one another. As shown in the figures a single bar is provided in each plane; but I wish it to be understood that my invention is not limited to this feature.

I am aware that heretofore silos for coal and similar matter forming comparatively large pieces have been constructed with superposed grates, the bars of said grates being offset with relation to one another. Such grates have the function of supporting members for the material for taking the pressure from the lower layers thereof. Accordingly the frames have broad supporting faces and the relative distances of the adjacent bars are small. However, in my improved construction the bars have small bearing surfaces and they are disposed large distances apart so as to provide wide spaces for the passage of the material therethrough.

Having now described and ascertained the nature of my invention and the manner in which the same is to be performed I now declare what I claim and desire to secure by Letters Patent of the United States:

1. An apparatus of the character described, comprising a trunk open at the top and having a discharge at the bottom, and a plurality of angularly arranged bars in the trunk for breaking up the material, the bars being disposed irregularly and in spaced relation to one another and to the sides of the trunk so that the material will not be supported thereon, the spaces provided by the bars, through which the material passes, being angular.

2. An apparatus of the character described comprising an upright trunk open at the top and having a discharge at the bottom, and a plurality of superposed frames composed of transverse bars for breaking up the material, the bars of the several frames being arranged in offset or staggered relation with respect to one another, the bars being arranged at such distances apart from each other and from the walls of the trunk that the material will not be supported thereon, the free spaces provided by the bars being unequal in the different frames.

In testimony whereof, I have signed my name to this specification in the presence of two subscribing witnesses.

KARL LÜFT.

Witnesses:
D. WILHELM ANDRES,
HUGO HAYS.